(12) United States Patent
Xicola Serrano

(10) Patent No.: US 12,227,256 B2
(45) Date of Patent: Feb. 18, 2025

(54) BAG FOR MOTORCYCLES

(71) Applicant: NAD, S.L., Barcelona (ES)

(72) Inventor: Jaume Xicola Serrano, Barcelona (ES)

(73) Assignee: NAD, S.L., Barcelona (ES)

( * ) Notice: Subject to any disclaimer, the term of this patent is extended or adjusted under 35 U.S.C. 154(b) by 107 days.

(21) Appl. No.: 17/991,217

(22) Filed: Nov. 21, 2022

(65) Prior Publication Data

US 2023/0159123 A1    May 25, 2023

(30) Foreign Application Priority Data

Nov. 22, 2021    (EP) ..................................... 21383050

(51) Int. Cl.
B62J 9/27       (2020.01)

(52) U.S. Cl.
CPC ....................... B62J 9/27 (2020.02)

(58) Field of Classification Search
CPC ............................................... B62J 9/27
USPC ........................................................ 224/413
See application file for complete search history.

(56) References Cited

U.S. PATENT DOCUMENTS

| | | | | | |
|---|---|---|---|---|---|
| 3,062,033 | A | * | 11/1962 | Schmalfeldt | E05B 83/16 292/DIG. 43 |
| 4,577,786 | A | * | 3/1986 | Dowrick | B62J 9/27 224/430 |
| 4,671,438 | A | * | 6/1987 | La Plante | B62J 9/27 224/438 |
| 5,638,709 | A | * | 6/1997 | Clavin | E05C 3/048 292/DIG. 31 |
| 8,152,036 | B2 | * | 4/2012 | Visenzi | B62J 9/27 224/419 |
| 8,292,139 | B2 | * | 10/2012 | Golub | B62J 7/08 224/558 |
| 8,864,002 | B2 | * | 10/2014 | Iida | B62J 7/04 224/430 |
| 9,056,641 | B2 | * | 6/2015 | Visenzi | B62J 9/23 |

(Continued)

FOREIGN PATENT DOCUMENTS

| EP | 1473216 A1 | 11/2004 |
|---|---|---|
| EP | 2552767 A2 | 2/2013 |
| EP | 3138764 A1 | 3/2017 |

(Continued)

OTHER PUBLICATIONS

Extended European Search Report issued in Application No. 21383050.8, dated May 10, 2022.

*Primary Examiner* — Peter N Helvey
(74) *Attorney, Agent, or Firm* — Amster, Rothstein & Ebenstein LLP

(57) ABSTRACT

The bag for motorcycles comprises at least one closing element (2) for closing the bag (1) and a plate (3) that includes at least one housing (4) for housing said at least one closing element (2), and at least one stop element (5) that is movable between a releasing position and a retaining position, so that in the releasing position the at least one closing element (2) can be removed from the at least one housing (4) and in the retaining position the at least one closing element (2) is prevented to be removed from the at least one housing (4).

It permits to provide a bag for motorcycles that provides an enhanced security, permitting to fix the bag to the motorcycle in a secure way and also closing the bag for prevent or reduce the risk of an unauthorized access to the bag.

9 Claims, 4 Drawing Sheets

(56) References Cited

U.S. PATENT DOCUMENTS

2015/0367902 A1 12/2015 Schanz et al.
2020/0231239 A1 7/2020 Visenzi

FOREIGN PATENT DOCUMENTS

WO 2011116757 A2 9/2011
WO 2011116757 A3 1/2012

* cited by examiner

BAG FOR MOTORCYCLES

CROSS-REFERENCE TO RELATED APPLICATIONS

This application claims priority to EP 21383050.8, filed Nov. 22, 2021, the contents of which are incorporated herein by reference in their entirety.

FIELD OF THE INVENTION

The present invention relates to a bag for motorcycles.

BACKGROUND OF THE INVENTION

One of the problems faced by motorcycle riders is the lack of space for placing personal objects in the motorcycle. To that end, the use of containers and bags fixed to the body of the motorcycle, and which allow placing objects therein is known.

These containers and bags can be placed in different positions of the motorcycle, such as e.g., on the rear sides of the motorcycle or on the rear portion of the motorcycle.

Furthermore, these containers and bags can be rigid or flexible. Usually, these containers and bags are detachably mounted on the motorcycle, e.g., by belts, so that the user can fix and remove the containers and bags from the motorcycle. One example of a device for fastening these containers and bags to a motorcycle is disclosed in EP3121097A1, of the same applicant than the present application.

For preventing the unauthorized access to the rigid containers, they comprise a lock that can be opened and closed by a key or code, but in the case of flexible bags, it is difficult to provide a secure bag.

In practice the user usually removes the flexible bags when he/she does not use the motorcycle, to prevent an unauthorized access to the bag or even the theft of the whole bag.

Furthermore, during a short stop, e.g., in gas stations or in border controls, it is also important to prevent an unauthorized access to the bag.

DISCLOSURE OF THE INVENTION

Therefore, an objective of the present invention is to provide a bag for motorcycles that provides an enhanced security, permitting to fix the bag to the motorcycle in a secure way and also closing the bag for prevent or reduce the risk of an unauthorized access to the bag.

With the bag for motorcycles of the invention said disadvantages are solved, presenting other advantages that will be described below.

The bag for motorcycles according to the present invention comprises at least one closing element for closing the bag, wherein the bag also comprises a plate that includes:
   at least one housing for housing said at least one closing element, and
   at least one stop element that is movable between a releasing position and a retaining position, so that in the releasing position the at least one closing element can be removed from the at least one housing and in the retaining position the at least one closing element is prevented to be removed from the at least one housing.

Thanks to these features, the bag for motorcycles according to the present invention can be closed, preventing, or making more difficult an unauthorized access to it, while the motorcycle is parked.

According to a preferred embodiment, the at least one stop element is placed on a shaft that is rotatable about its longitudinal axis, and the shaft preferably comprises at one of its ends a lock cylinder for driving the rotation of the shaft.

Preferably, the plate also comprises at least one fixing element for fixing the bag to a motorcycle, said at least one fixing element being movable between an engagement position and a detachment position, so that in the engagement position the bag is fixed to a motorcycle and in the detachment position the bag can be detached from the motorcycle.

According to a preferred embodiment, the at least one fixing element is mounted on an arm and their movement is driven by a lever.

Furthermore, the plate can also comprise a lock that permits or locks the movement of the lock cylinder and/or the lever, and preferably the lock comprises a key for permitting or locking the movement of the lock cylinder and/or the lever.

This way, the user can easily lock the fixation of the bag to the motorcycle and also closing the bag.

According to a preferred embodiment, the at least one closing element is a hook, and the at least one housing is a through hole.

Furthermore, the at least one stop element, in its retaining position, preferably protrude from the plate and is placed besides one end of the at least one housing.

The at least one closing element is preferably joined at one end of a strap in a fixed position, so that the at least one closing element cannot be moved along said strap. Therefore, this position determines the maximum capacity of the bag, because if the bag is filled with an excessive capacity, the at least one closing element could not be inserted inside the at least one housing.

BRIEF DESCRIPTION OF THE DRAWINGS

For better understanding of what has been disclosed, some drawings in which, schematically and only by way of a non-limiting example, a practical case of embodiment is shown.

DESCRIPTION OF A PREFERRED EMBODIMENT

Figure 1:
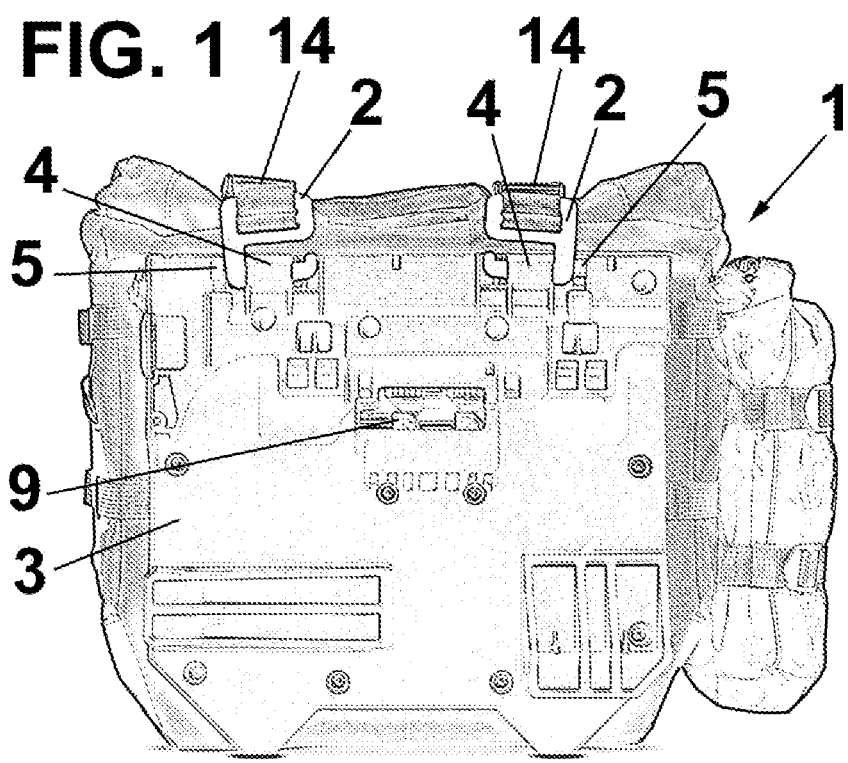
FIG. 1 is a rear view of the bag for motorcycles according to the present invention.

The bag for motorcycles according to the present invention is design generally by numeral reference 1, and it is preferably a flexible bag comprising a plate 3 attached on one of its sides.

The bag 1 can be closed by closing elements 2, which according to the shown embodiment are hooks, that can be housed in housings 4 provided in the plate 3, for closing the bag 1. The number of closing elements 2 and housings 4 can be of one or more, and in the shown embodiment, this number is two.

Said housings 4 are, according to the shown embodiment, through holes, inside which the closing elements 2 are housed for closing the bag 1.

Figure 2:
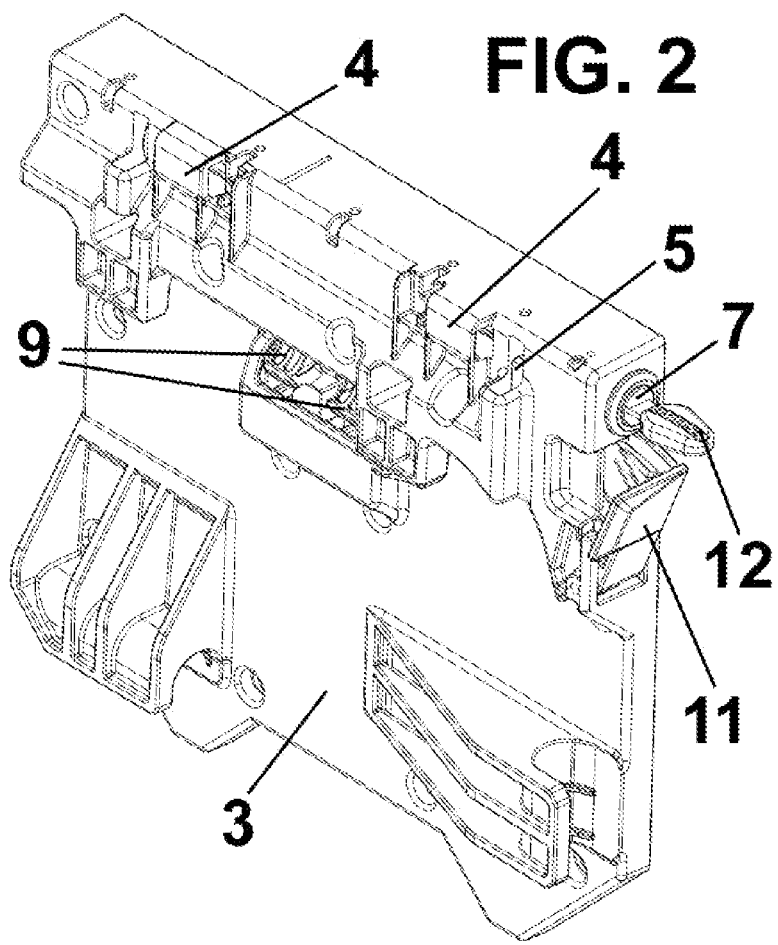
FIG. 2 is a perspective view of the plate of the bag for motorcycles according to the present invention, in the position in which the stop elements are in their releasing position and the fixing elements are in their detachment position.
Figure 3:
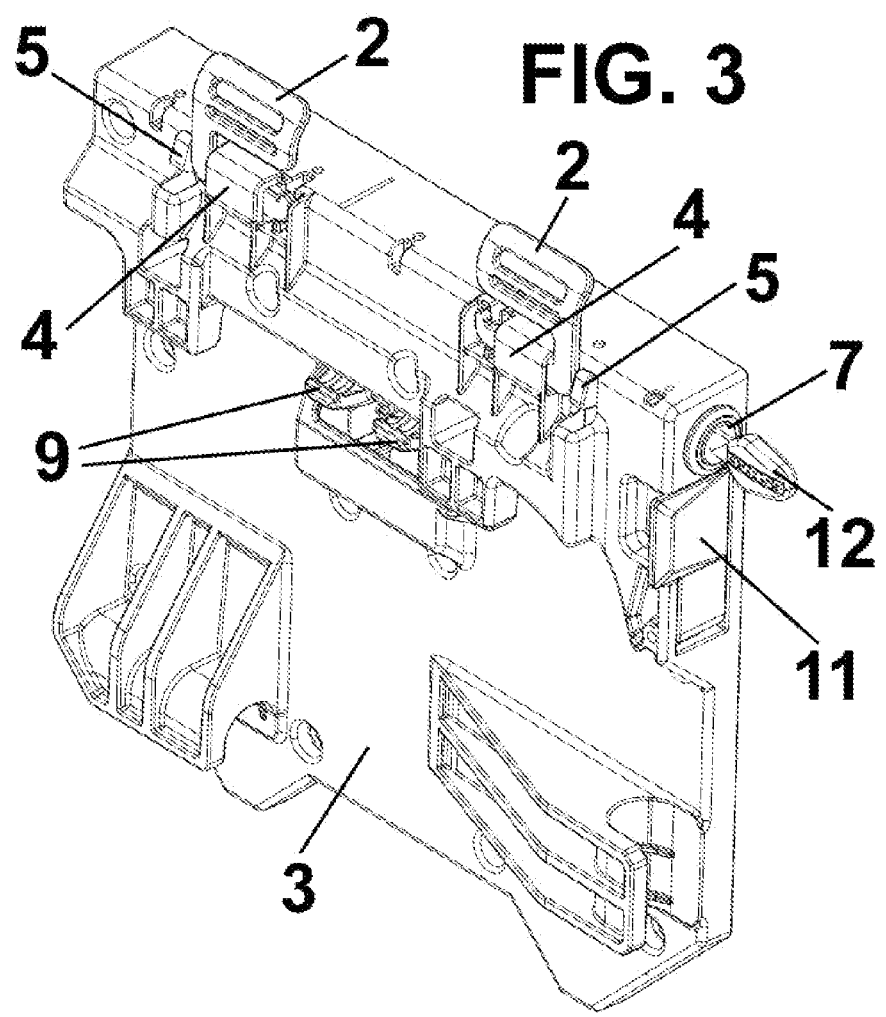
FIG. 3 is a perspective view of the plate of the bag for motorcycles according to the present invention, in the position in which the stop elements are in their retaining position and the fixing elements are in their engagement position.

To prevent the removal of the closing elements 2 from the housings 2, the plate 3 comprises stop elements 5, that are movable between a releasing position (shown in FIG. 2) and a retaining position (shown in FIG. 3).

In the releasing position the closing elements 2 can be removed from the housings 4, i.e., the stop elements 5 do not protrude from the plate 3, and in the retaining position the closing elements 2 are prevented to be removed from the housings 4, i.e., the stop elements 5 protrude from the plate 3 and are placed besides one end of the housings 4, so that if the closing elements 2 are moved for their removal from the housings 4, they will contact the stop elements 2, preventing their removal.

Figure 4:
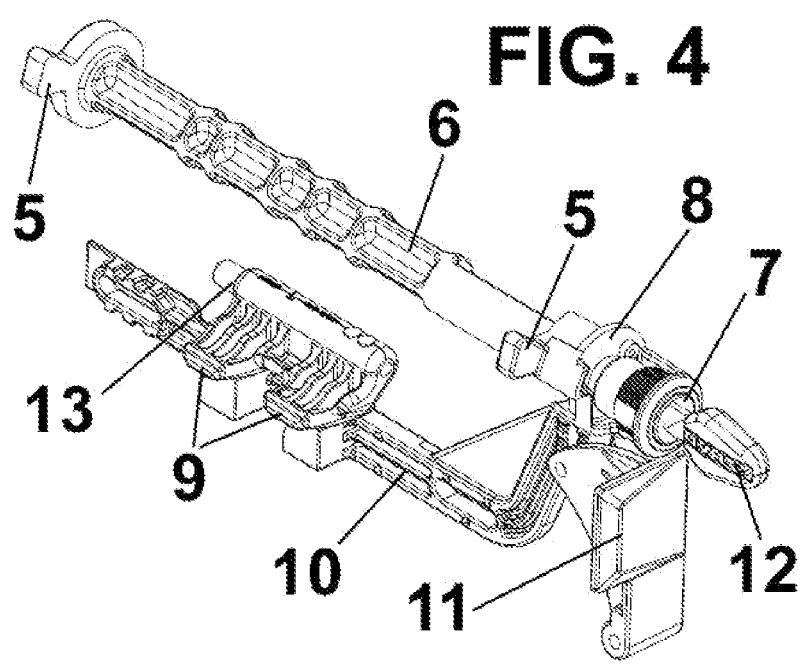
FIG. 4 is a perspective view of the internal mechanism that releases or closes both the fixing elements that fix the bag to the motorcycle and the stop elements that prevent the removal of the closing elements of the bag.

The mechanism that permits the movement of the stop elements 5 is shown in FIG. 4, and it comprises a shaft 6 on which the stop elements 5 are placed, preferably on both ends of the shaft 6. This shaft 6 can be made from one or more pieces.

This shaft 6 is rotatable along its longitudinal axis, and its rotation is driven manually by a rotor 8 that is placed on an end of the shaft 6. The rotation of this rotor 8 can be locked by a lock cylinder 7 using a key 12, preventing an unauthorized driving of the rotor 8.

According to a preferred embodiment, the stop elements 5 are protrusions, and they are placed substantially perpendicular with respect to the longitudinal axis of the shaft 6.

The closing elements 2 are preferably joined at one end of respective straps 14, so that the closing elements 2 cannot be moved along said straps 14. Therefore, this position determines the maximum capacity of the bag 1, because if the bag 1 is filled with an excessive capacity, the closing elements 2 could not be inserted inside the housings 4.

Furthermore, the plate 3 also comprises fixing elements 9, that permit to fix the bag 1 to a motorcycle, not shown in the drawings. The number of fixing elements 9 can be of one or more, and in the shown embodiment, this number is two.

Said fixing elements 9 are movable between an engagement position (shown in FIG. 3) and a detachment position (shown in FIG. 2), so that in the engagement position the bag 1 is fixed to a motorcycle and in the detachment position the bag 1 can be detached from the motorcycle.

According to the shown embodiment, the fixing elements 9 are curved protrusions, and in the engagement position they protrude from the plate 3 to be engaged with complementary elements, such as rods, of the motorcycle.

In the detachment position, the fixing elements 9 do not protrude from the plate 3, and they are not engaged with the complementary elements, so that the bag 1 can be removed from the motorcycle.

The mechanism that permits the movement of the fixing elements 9 is also shown in FIG. 4. According to this embodiment, the fixing elements 9 are mounted on an arm 10 and their movement is driven by a lever 11. E.g., when a user drives the lever 11, the fixing elements 9 can be moved, i.e., rotated about a rotation axis 13 that is preferably parallel with respect to the arm 10.

The rotation about the rotation axis 13 is driven by a torsion spring. When the user moves the lever 11 for detaching the bag 1 from the motorcycle, the arm 10 is also moved, so that the fixing elements 9 are not engaged with the complementary elements of the motorcycle.

When the user moves the lever 11 for fixing the bag 1 to the motorcycle, the arm 10 slides horizontally, rotating the axis 13 by chamfers or the like, fixing the bag 1 to the motorcycle.

The lever 11 preferably can be also locked by the rotor 8, so that with the use of the key 12, the user can also lock the movement of the fixing elements 9.

The use of the bag 1 according to the present invention is very simple. The user can engage or fix the bag 1 to a motorcycle using the fixing elements 9 just placing the bag 1 with the fixing elements 9 engaging the complementary elements of the motorcycle.

Furthermore, for closing the bag 1, the user can place the closing elements 2 inside the housings 4.

During the use of the motorcycle, it is not necessary to lock neither the closing elements 2, but when the motorcycle is parked in a public parking or similar spaces, the user can lock both the closing elements 2 and the fixing elements 9 at the same time, just using the key 12 with the lock cylinder 7.

The key 12 cannot be removed from the lock cylinder 7 with the lever 11 in the open position. This is for preventing the detachment of the bag 1 during the use of the motorcycle.

Once locked, it is prevented, or at least is more difficult, the unauthorized access to the bag 1 and its removal from the motorcycle.

Although reference has been made to specific embodiments of the invention, it is apparent to a person skilled in the art that the described bag for motorcycles is susceptible of numerous variations and modifications, and that all the details mentioned can be replaced by other technically equivalents, without departing from the scope of protection defined by the appended claims.

The invention claimed is:

1. Bag for motorcycles, comprising at least one closing element (2) for closing the bag (1), characterized in that the bag (1) also comprises a plate (3) that includes:
   at least one housing (4) for housing said at least one closing element (2), and
   at least one stop element (5) that is movable between a releasing position and a retaining position, so that in the releasing position the at least one closing element (2) can be removed from the at least one housing (4) and in the retaining position the at least one closing element (2) is prevented to be removed from the at least one housing (4),
   wherein the plate (3) also comprises at least one fixing element (9) for fixing the bag (1) to a motorcycle, said at least one fixing element (9) being movable between an engagement position and a detachment position, so that in the engagement position the bag (1) is fixed to a motorcycle and in the detachment position the bag (1) can be detached from the motorcycle, and
   wherein the at least one fixing element (9) is mounted on an arm (10) and its movement is driven by a lever (11).

2. Bag for motorcycles according to claim 1, wherein the at least one stop element (5) is placed on a shaft (6) that is rotatable about its longitudinal axis.

3. Bag for motorcycles according to claim 2, wherein the shaft (6) comprises at one of its ends a rotor (8) for driving the rotation of the shaft (6).

4. Bag for motorcycles according to claim 3, wherein the bag (1) also comprises a lock cylinder (7) that permits or locks the movement of the rotor (8) and/or the lever (11).

5. Bag for motorcycles according to claim 4, wherein the lock cylinder (7) comprises a key (12) for permitting or locking the movement of the rotor (8) and/or the lever (11).

6. Bag for motorcycles according to claim 1, wherein the at least one closing element (2) is a hook.

7. Bag for motorcycles according to claim 1, wherein the at least one housing (4) is a through hole.

8. Bag for motorcycles according to claim 1, wherein the at least one stop element (5), in its retaining position, protrudes from the plate (3) and is placed besides one end of the at least one housing (4).

9. Bag for motorcycles according to claim 1, wherein the at least one closing element (2) is joined at one end a strap (14) in a fixed position.

* * * * *